July 11, 1939.   P. E. HOVGARD   2,165,482
AIRCRAFT WING ARRANGEMENT
Filed March 26, 1938   2 Sheets-Sheet 1

INVENTOR
PAUL E. HOVGARD.
BY
ATTORNEY

July 11, 1939.   P. E. HOVGARD   2,165,482
AIRCRAFT WING ARRANGEMENT
Filed March 26, 1938   2 Sheets-Sheet 2

INVENTOR
PAUL E. HOVGARD.
BY
ATTORNEY

Patented July 11, 1939

2,165,482

UNITED STATES PATENT OFFICE 2,165,482

AIRCRAFT WING ARRANGEMENT

Paul E. Hovgard, Kenmore, N. Y., assignor to Curtiss-Wright Corporation, a corporation of Delaware Application March 26, 1938, Serial No. 198,217

3 Claims. (Cl. 244—13)

This invention relates to aircraft and is particularly concerned with improvements in the wing arrangement of aircraft having a body extending forward of the wing or having a plurality of bodies spaced along the span of the wing and extending forward.

The application deals particularly with multi-motored monoplanes, or, with single motored monoplanes when the nose of the fuselage extends unusually far forward of the wing. In certain designs of this type the inter-action of the body or bodies and the wing, causes the airflow to become turbulent before it passes over the wing, and there results a stall of the wing in that region at a lower angle of attack than that at which the stall would otherwise occur. This type of breakdown of flow over a wing has been termed an "interference burble".

The interference burble takes place quite suddenly and covers a fairly large percentage of the total wing area, whereas, normally a wing will stall at one small point at a certain angle of attack and as the angle of attack is further increased the stalled area will gradually cover more and more of the total wing area.

As a result of this interference burble the portion of the wing affected ceases to deflect air downwardly. The angle of airflow over the horizontal tail surfaces therefore is so changed that the down load produced by them is relatively reduced and the tail rises relative to the rest of the airplane. The portion of the wing affected by the interference burble no longer produces lift. The total lift of the airplane is appreciably reduced and the airplane therefore suddenly drops. Since, as stated above, the tail rises relative to the rest of the airplane, there will result a sudden diving which cannot be prevented by any manipulation of the controls on the part of the pilot because of the change in airflow over the tail as explained above.

Any body passing through the air will leave behind it a more or less turbulent wake. A stalled wing leaves very turbulent air in its wake. If the tail of the airplane is in this wake it will be buffeted by the turbulent air. Since the interference burble is a stall of a portion of a wing occurring at a relatively low angle of attack, it may cause tail buffeting which would otherwise be avoided. In fact, if the interference burble is very mild in that it covers only a small portion of the wing, tail buffeting may be the only evidence of it.

In ordinary flight away from the ground the lift coefficient of a wing depends upon its angle of attack to the airflow. When in proximity to the ground, however, the lift co-efficient for a given angle of attack will increase. Test in free flight, as well as some observations in the wind tunnel, have shown that the occurrence of the interference burble varies more nearly with the lift co-efficient than with angle of attack. Therefore, as approaching the ground for a landing, the interference burble will occur at a lower angle of attack than when at a distance above the ground. Once the airflow has broken down the angle of attack sometimes must be decreased by 3 or 4 degrees before normal airflow over the wing will be picked up again.

The principle of my invention lies in the reduction of the volume of the body or bodies protruding ahead of the wing by simply moving the leading edge of the wing in the vicinity of the bodies forward, and then further reducing localized turbulence by placing fillets in the sharp corners, changing the angle of entry of the nose by increasing the camber of the wing and reducing the lift co-efficient of the wing in the region of the protruding bodies relative to the remainder of the wing. During flight at relatively low angles of attack, the region of the wing that has been treated to prevent the interference burble may carry a smaller portion of the airplane weight per unit of area. As the angle of attack is increased, however, the delay of the stall in the vicinity of the forward protruding body or bodies, permits each portion of the wing to reach its stalling angle at approximately the same time, thereby improving the capacity of the wing as a whole.

Remedies for the interference burble also comprise lowering the body relative to the wing, the use of a deeply cambered wing between protruding bodies, or the use of an enlarged "blister" which extends the effective leading edge of the wing section ahead of its normal position. A further remedy comprises the adjustment of the angles of attack of the outboard and inboard wing sections so that the inboard section has a lower angle of attack than the outboard section. A further possibility in curing the interference burble is the use of different inboard and outboard wing profiles, the inboard profile having a wider range of angle of attack before burbling occurs than the outboard wing section.

The present invention has for an object the correction of the interference burble in aircraft of the type above indicated by one or more of the above suggested expedients and further objects will be apparent in reading the annexed description in which.

Figure 4:
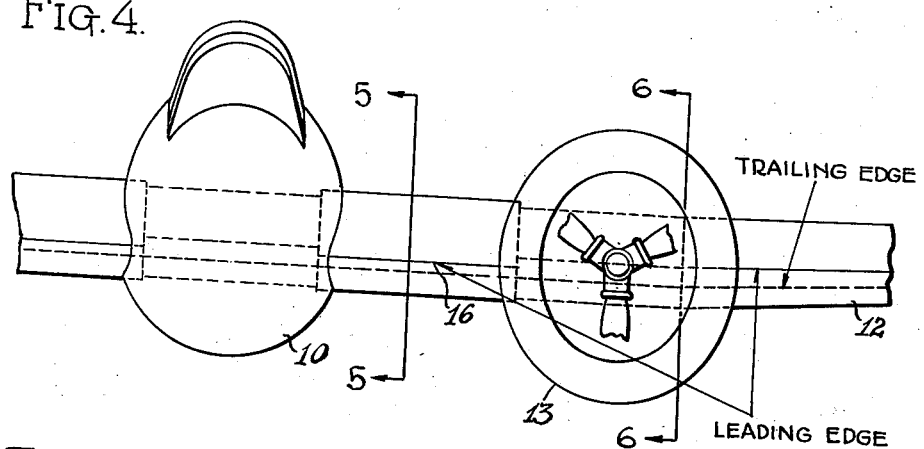
Fig. 4 is a fragmentary front elevation of the airplane of Fig. 1.
Figure 5:
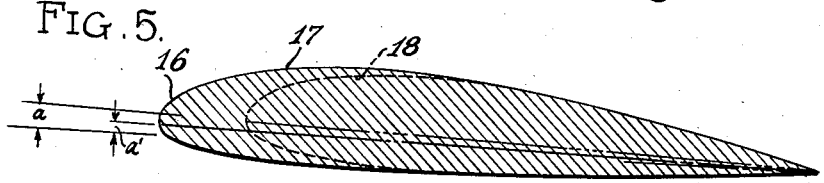
Figure 6:
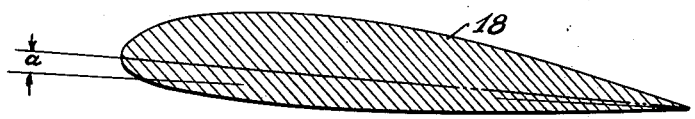
Figure 7:
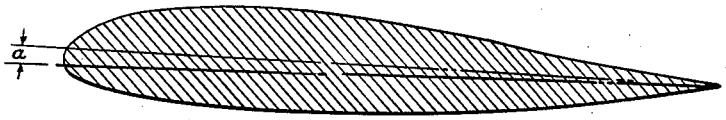

Figs. 5 and 6 are sections respectively, on the lines 5—5 and 6—6 of Fig. 4; and Fig. 7 is a section showing an alternative wing profile for an inboard portion of the span.

Referring to Figs. 1, 2, 4, 5, and 6, I show an aircraft fuselage 10 whose nose extends a substantial distance ahead of the normal leading edge 11 of a monoplane wing 12, the latter extending from the fuselage sides. Engine nacelles 13 carrying power plants 14 are mounted on the wing 12 at each side of the fuselage 10 and, according to conventional practice, the wing 12 would have a substantially similar profile and chord length from tip to tip. In the above statement, account is taken of the conventional use of tapered wings wherein, as the wing tapers to a smaller chord toward the tip the profiles are proportionately diminished in size. In conventional practice likewise, washin or washout may be incorporated, washin comprising an increase in the angle of attack in the wing from root to tip, and washout being a decrease in the angle of attack in the wing from root to tip. The washin or washout of the wing is incorporated primarily for adjusting the stalling tendencies of the normal wing or of adjusting the controllability of the aircraft and bears no particular relationship to the problem of interference burble, here dealt with, as produced by airstream interference caused by the protuberant bodies on the aircraft wing.

In the present invention I set out to cure the effect of the interference burble by providing an advanced leading edge 16 between the fuselage 10 and the nacelle 13, this advanced leading edge covering only the inboard section of the wing, designated as 17, between the nacelle and the fuselage. The outboard section of the wing, extending beyond the nacelle 13 is designated as 18. In the case of aircraft already in existence which have difficulties with the interference burble, the forward leading edge 16 on the inboard wing section 17 may be added in the form of a blister to the existing wing section. In the case of newly projected aircraft, the forward leading edge 16 would be incorporated in the basic design of the airplane. It will be seen that the profiles of the wing sections 17 and 18 are thus divergent as to form, chord length and camber, the inboard section preferably having longer chord and deeper camber than the outboard section, and also a lesser angle of attack.

I also contemplate the use of an inboard wing section 17 whose angle of attack is substantially less than the angle of attack of the outboard section 18. This is shown in Figs. 5 and 6 wherein $a$ denotes the angle of attack of the outboard wing section 18, and wherein $a'$ designates angle of attack for the inboard wing section 17 for a given direction of relative wind.

Figure 3:
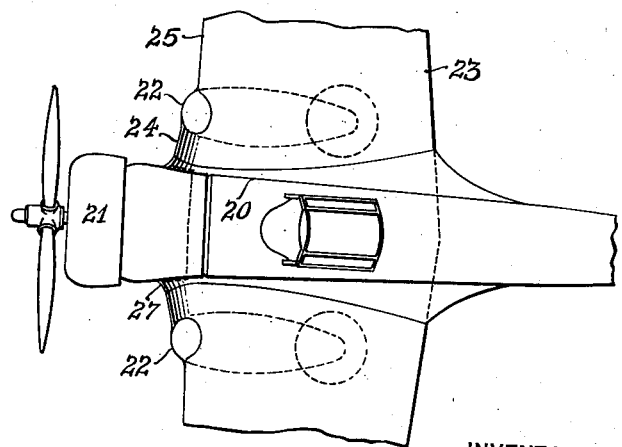
Fig. 3 is a plan of a different type of airplane embodying the invention.

Fig. 3 shows a single engine aircraft including a fuselage 20 having power plant 21 at its forward end, and including landing gear housings 22 which form outboard protuberances on the wing 23. As shown, the leading edge of the wing between the fuselage and the protuberances 22 is well in advance of the leading edge of the balance of the wing, the respective leading edges being designated as 24 and 25. The wing sections rearward of the respective leading edges 24 and 25 may partake of divergent profiles and divergent angles of attack as above described and likewise, as described hereinafter in connection with the use of alternative wing profiles.

Figure 1:
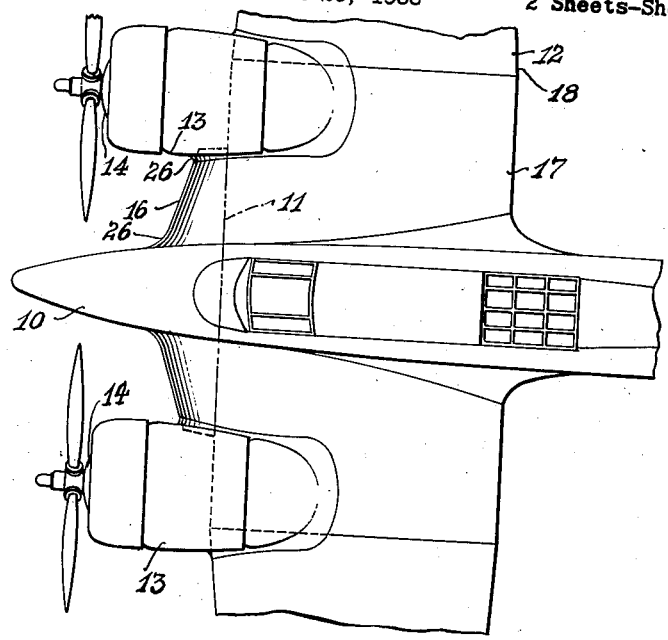
Fig. 1 is a fragmentary plan of a bi-motored airplane embodying the invention.
Figure 2:
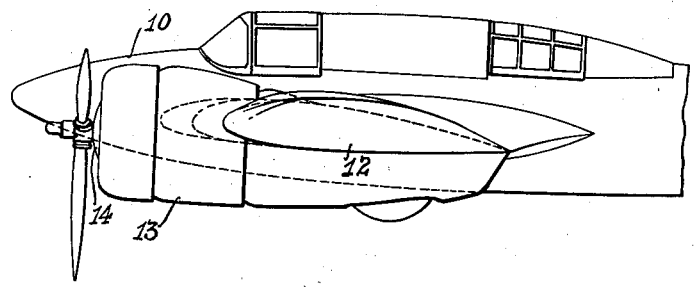
Fig. 2 is a side elevation of the forward part of the airplane of Fig. 1.

Figs. 1 and 3 also show the use of generous forward fillets 26 and 27 which further assist in reducing the interference burble.

Fig. 7 shows a wing profile having a slightly upturned trailing edge, this being suitable for use on an inboard wing section such as 17 along with an outboard wing section such as 18. Such a wing section may be arranged to have a wider range of angle of attack prior to stalling although its lift and drag characteristics may not be so favorable as in a conventional section such as 18. However, a combination of the section of Fig. 7 with that of Fig. 6 serves to suppress the interference burble, and to prevent stalling of the inboard section prior to stalling of the outboard section.

The invention has been shown as applied to bi-motored or single motor airplanes but the principles of the invention may be applied with equal force to constructions utilizing more than two power plants or to wings having a plurality of wing protuberances therealong. As a possibility in this connection, aircraft are now projected utilizing four engines spaced along the leading edge of the wing, two on each side of the plane of symmetry. The differential angles of attack of the intermediate wing sections, and the wing profiles of the intermediate sections, may be adjusted according to the principles of this invention to the suppression of interference burble and to the suppression of the tail buffetting which may accrue therefrom.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. In aircraft comprising a long nose fuselage, an inboard wing section of less thickness than the fuselage extending laterally therefrom, said inboard section being characterized by a profile of long chord, low angle of incidence, and a leading edge rearwardly spaced from the fuselage nose; a protuberance at the outer end of said inboard section extending forwardly of the section leading edge; and an outboard wing section extending laterally beyond said protuberance, and having the following characteristics: A leading edge farther to the rear than that of the inboard section, a thickness substantially equal to that of the inboard section, a trailing edge comprising a substantial prolongation of the trailing edge of the inboard section, and an effective angle of incidence lower than that of the inboard section.

2. In aircraft comprising laterally spaced streamlined bodies, an inboard wing section joining said bodies having its leading edge rearward of the body noses and having a profile characterized by a long chord, a thickness less than that of the bodies, and a profile so disposed as to provide a certain angle of incidence for said section; and an outboard wing section extending laterally beyond one said body having its leading edge spaced farther to the rear than the leading edge of said inboard section, said outboard section having a profile characterized by a shorter chord than that of the inboard section, a thickness substantially equivalent to that of the inboard section, a higher angle of incidence than that of the inboard section, and a trailing edge comprising a substantial lateral prolongation of the trailing edge of said inboard section.

3. In aircraft, a wing system having spaced spanwise thereof at least two bodies extending a substantial distance forward of the leading edge of the wing system and defining therebetween an inboard wing section and defining therebeyond outward wing sections, the system throughout its span having a substantially uniform thickness and a substantially continuous trailing edge, the inboard section being different from the outboard section in that its leading edge is in advance of that of the outboard section, its chord length is greater than that of the outboard section, and its effective angle of incidence is higher than that of the outboard section.

PAUL E. HOVGARD.